Figure 1:
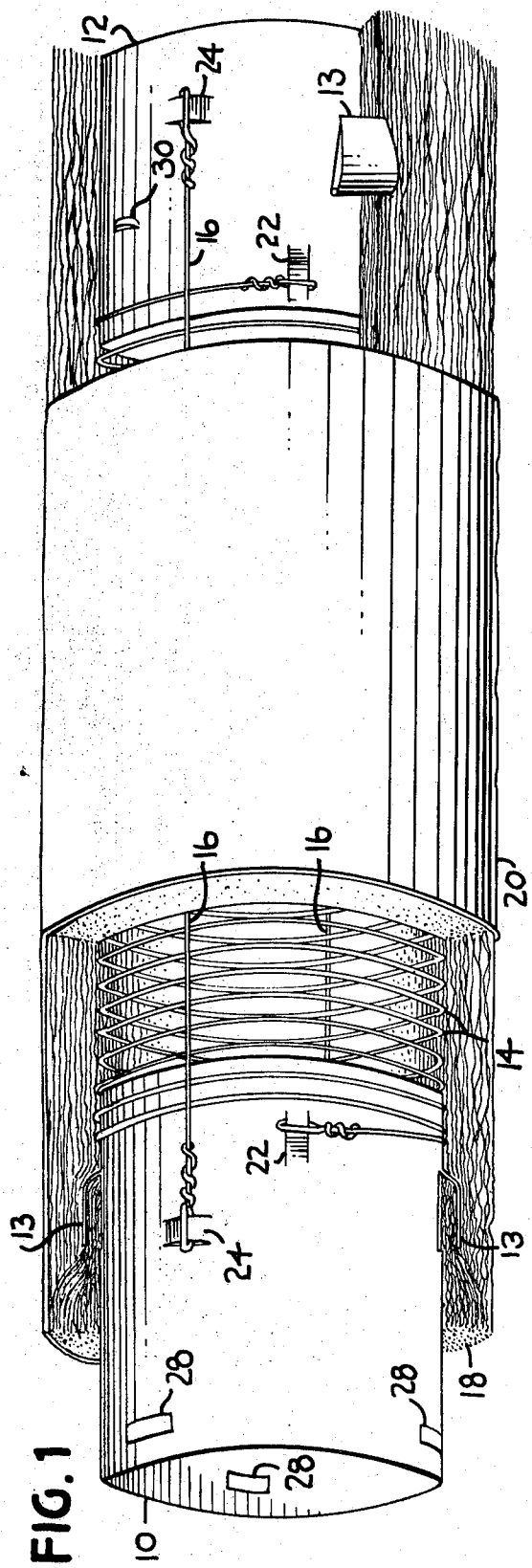

United States Patent

[11] 3,565,120

[72] Inventor Richard J. Bennett
 Pittsburgh, Pa.
[21] Appl. No. 784,455
[22] Filed Dec. 17, 1968
[45] Patented Feb. 23, 1971
[73] Assignee P P G Industries, Inc.
 Pittsburgh, Pa.

[54] FLEXIBLE DUCT WITH INSULATION HOLDING MEANS ON COUPLING MEMBERS
 9 Claims, 2 Drawing Figs.
[52] U.S. Cl. .................................................. 138/147
[51] Int. Cl. .................................................. F16l 11/02
[50] Field of Search ......................................... 138/147,
 118, 120, 124, 129, 132, 137, 139, 109

[56] References Cited
UNITED STATES PATENTS

| | | | |
|---|---|---|---|
| 1,223,835 | 4/1917 | Schmus ........................ | 138/147 |
| 3,216,459 | 11/1965 | Schroeder et al. ............. | 138/139 |
| 3,394,737 | 7/1968 | Hoffmann et al. ............. | 138/109 |

*Primary Examiner*—Louis D. Rimrodt
*Attorney*—Chisholm & Spencer

ABSTRACT: A flexible insulated duct comprising a wire helix wrapped with insulating material encased in a fluid-impermeable sleeve and terminated with connector members having impaling lugs that penetrate the insulating material and clinch the insulating material in place with respect to the connector members.

PATENTED FEB 23 1971

3,565,120

INVENTOR
RICHARD J. BENNETT

BY
*Christopher A Spencer*
ATTORNEYS

FLEXIBLE DUCT WITH INSULATION HOLDING MEANS ON COUPLING MEMBERS

BACKGROUND OF THE INVENTION

This invention relates to flexible insulated duct for the conduction of gaseous fluids in commercial or residential heating and/or air conditioning systems. More specifically, the present invention relates to flexible insulated duct comprised of a helically wound wire wrapped with porous insulating material encased in a flexible, fluid-impermeable sleeve and terminated with sheet metal connector members having means to clinch the insulating material in place.

The present invention is an improvement over flexible duct constructions such as those disclosed in copending application Ser. No. 701,301, entitled "Flexible Duct," filed Jan. 29, 1968 by Malcolm Hay, Jr., now U.S. Pat. No. 3,502,114 copending application Ser. No. 760,171, entitled "Longitudinally Reinforced Flexible Duct," filed Sept. 17, 1968 by William L. Runshe and Clarence H. Helbing, and copending application Ser. No. 784,456, entitled "Flexible Duct With Interlocking-Type Coupling," filed Dec. 17, 1968 by Clarence H. Helbing, Richard J. Bennett, Frank E. Wilson, Alphonso C. Pecora, Malcolm Hay, Jr. and Winfield T. Irwin all assigned to the assignee of the present invention.

As disclosed in the aforesaid copending applications, flexible duct constructions have previously been proposed which are comprised of a dimensionally unstable wire helix terminated with connector members and having a circumferential blanket of insulating material adhesively bonded to the helix and the connector members. Flexible ducts of the above type of construction have a number of distinct advantages over other types of flexible duct construction. However, it has now been found that flexible ducts of the above type of construction may be susceptible to serious damage by reason of high axial and/or torsional forces being imparted to one or both of the connector members during normal handling or use.

Flexible ducts constructed in the above manner rely principally upon the shear strength of the blanket of insulating material at the surface of the blanket which is adhesively bonded to the connector members to resist separation of the connector members from the insulating material. Under certain conditions, and in particular under high axial and/or torsional loads, this shear strength has not always been found to be adequate. Accordingly, separation may occur, and this separation may either be partial or complete. Obviously, the extent of the separation determines the extent to which the duct section will be weakened thereby. If complete separation occurs, the duct section is generally considered to be unfit for use. However, if less than complete separation occurs, it is uncertain as to whether it will be note noticed or not, and too frequently such separation goes completely unnoticed until a subsequent failure of the duct section occurs.

The present invention proposes to overcome the aforementioned deficiencies of prior art flexible duct construction by providing flexible insulated duct with connector members having impaling lugs projecting outwardly from the outer surface thereof to penetrate the insulating material and clinch the insulating material in place with respect to the connector members. In accordance with the present invention, the coupling members become so integrated with the adjacent insulating material that they essentially function as a unit therewith. Thus, in the practice of this invention, it is possible to take greater advantage of the physical strength characteristics of the insulating material, including the aforementioned surface shear strength thereof, before complete separation of the connector members from the insulating material can occur.

Figure 2:
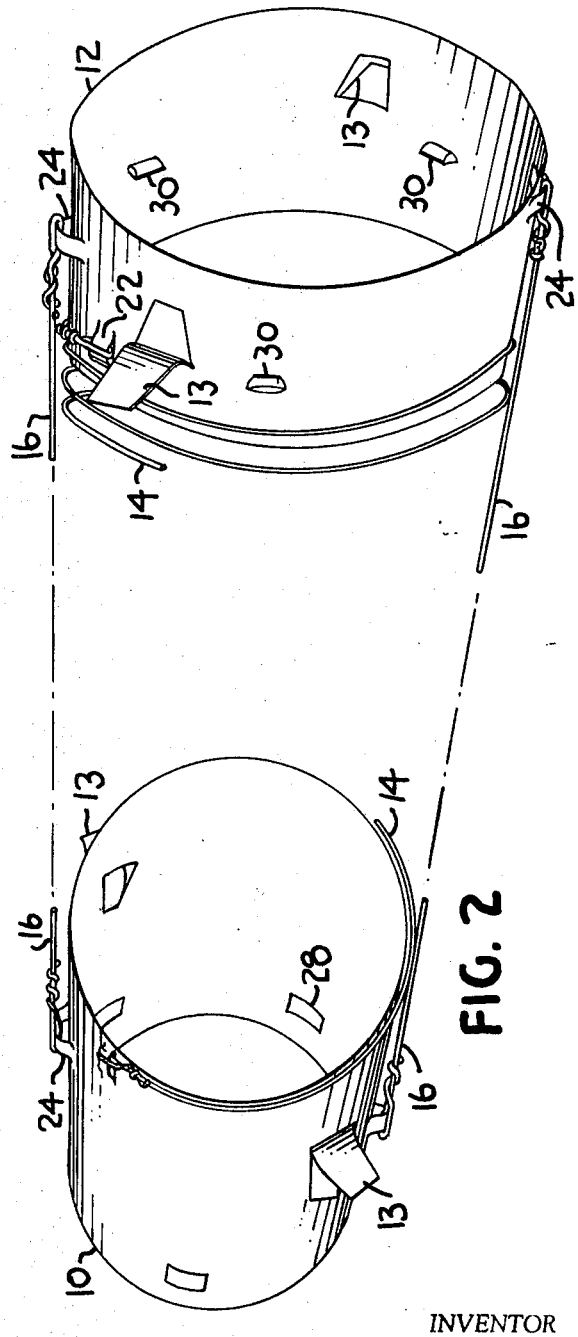

The foregoing and other objects, features and advantages of this invention will become more apparent when considered in connection with the accompanying drawing, in which:

FIG. 1 is a perspective view, broken away, of a short section of flexible insulated duct provided with connector members embodying the principles of this invention; and FIG. 2 is a perspective view of the duct of FIG. 1 prior to being wrapped with insulating material and encased in a flexible outer sleeve.

Depicted in the drawing is a flexible duct construction embodying the principles of the present invention. Broadly, the flexible duct construction shown is composed of a wire helix 14 wrapped with insulating material 18, encased in a flexible, fluid-impermeable sleeve 20 and terminated with male and female connector members 10 and 12 having impaling lugs or projections 13 that penetrate the insulating material and clinch the insulating material in place. As shown in FIGS. 1 and 2, connector members 10 and 12 may be interlocking-type connectors. Also as shown in FIGS. 1 and 2, longitudinal reinforcement 16 may be employed in the construction of the flexible duct of this invention to enhance the axial tensile strength strength of the duct.

With particular reference to FIGS. 1 and 2, the manufacture of the duct therein shown proceeds by mounting the pair of interlocking-type connector members 10 and 12 at spaced locations on a collapsible mandrel (not shown). An end of the wire forming the wire helix is then affixed to one of the connectors, e.g., the female connector member 12, and is helically wound around a length of the connector, along the length of the mandrel (not shown) and around a length of the other connector member, e.g., the male connector member 10. During winding, an adhesive coating is continuously applied all along the length of the wire forming the helix 14. Upon reaching the desired length, the wire is terminated and the free end is affixed to the other connector member, e.g., the male connector member 10.

One or more flexible cordlike tension members 16 are then placed over the wire helix and affixed at their ends to connector members 10 and 12. Preferably, at least a pair of tension members 16 are used and are affixed to the connector members 180° apart so that the reinforcement is parallel to the axis of the helix. A blanket of insulating material 18 is next sprayed with an adhesive that covers a sufficient portion of one surface thereof to provide at least one circumferential wrap around the wire helix. The insulating blanket 18 is then wrapped convolutely or circumferentially around the connectors 10 and 12, the wire helix 14 and the longitudinal reinforcement 16 so that the adhesive coated surface faces the interior of the duct.

As the insulating blanket 18 is wrapped around the connector members 10 and 12, one or more circumferential wraps of the blanket are impaled on upstanding lugs 13 provided on each of the connector members. The free ends of lugs 13 are then preferably bent towards the nearest adjacent end of the duct, i.e., away from the center of the duct, until they lie essentially parallel to the axis of the duct. This clinches the insulating blanket in place with respect to each of the connector members. Subsequent wraps of the insulating blanket may then be wrapped over the bent lugs.

Preferably, the insulating blanket covers substantially all of the female connector 12 and only a portion of the male connector 10. After wrapping, the trailing end of the insulating blanket is preferably secured in place by means of staples (not shown). An outer sleeve of flexible fluid-impermeable material 20 is then pulled over the insulating blanket and the mandrel is collapsed to release the finished section of duct.

In the practice of the present invention, many different materials can be used to produce the helix element of the duct. As disclosed in the aforementioned copending applications, the helix material should be resistant to atmospheric corrosion, should possess sufficient strength and rigidity to prevent collapse of the duct in a radial direction upon application of moderate pressures, but should not be so strong as to adversely affect the flexibility of the duct. The helix material should also be sufficiently elastic to cause spring-back of the duct to its original shape as soon as external deforming pressures on the duct are relaxed. The desired helix material should exhibit, then, a balance of good flexibility, elasticity and strength. Any material roughly conforming to the form of a slender rod or wire composed of metal, plastic or a combination thereof, having a circular or noncircular cross section and exhibiting a suitable balance of these characteristics can be used.

Galvanized hard-drawn steel spring wire has been found to be an excellent helix material. For ducts 9 inches or less in inside diameter, a galvanized wire of 0.041 inch in diameter is preferred. For ducts from 10 to 18 inches in inside diameter, a wire 0.051 inch in diameter should be used. In all duct sizes, the preferred spacing of the convolutions of the wire helix is three-fourth of an inch from center to center, although the spacing may range from one-fourth to 1¼ inches and still produce a suitable duct.

FIGS. 1 and 2 show the wire helix fastened to connectors or couplings 10 and 12. In accordance with the aforesaid copending applications, connectors or couplings 10 and 12 are provided with tab means, hereinafter described, for fixing and stabilizing the ends of the wire helix 14 and the longitudinal reinforcement 16. In each of the embodiments shown in the drawing, the male connector 10 and the female connector 12 both comprise a galvanized sheet metal sheet sleeve or coupling of cylindrical cross section. For suitable resistance to atmospheric corrosion, the zinc-coated (galvanized) sheet steel and steel wire used in the construction of the duct of this invention preferably has a uniform zinc coating of about 0.3 ounce per square foot of surface area coated (0.6 ounce per square foot of sheet), as determined by the Standard Method of Test for Weight of Coating on Zinc-Coated (Galvanized) Iron or Steel Articles, ASTM Designation A90–53.

Projecting from the outer surface of each connector, there is shown an open tab or loop 22 that forms an integral part of the connector and is preferably produced by a simple stamping operation, such as by punch-pressing a small portion of the connector material outwardly from the remainder of the connector material. As shown, the ends of the wire helix are inserted through the loops 22 and the wire is then twisted on itself to firmly secure the ends of the wire to the connectors and thereby stabilize the ends of the wire helix.

Also projecting from the outer surface of the connectors are open tabs or loops 24 that provide means for attaching longitudinal reinforcement 16 to the connectors. During manufacture of the duct, these tabs or loops 24 are longitudinally aligned on the mandrel so that the reinforcement 16 is subsequently attached to the connectors parallel to the axis of the duct. Shown in FIGS. 1 and 2 are two longitudinal reinforcement members 16. For this purpose, as best shown in FIG. 2, a pair of tabs or loops 24 spaced 180° apart are provided on each of the connectors.

One preferred longitudinal reinforcement 16 that is usable with all duct sizes is galvanized steel wire of 0.04 inch diameter. As shown in the drawing, the ends of the wire reinforcement 16 are inserted through the loops 24 and the wire is then twisted on itself to firmly secure the ends of the wire to the connectors, thereby longitudinally reinforcing the wire helix-connector complex against tensile forces tending to separate the connectors and straighten the wire forming the helix 14.

Another longitudinal reinforcement (not shown) that may be used in lieu of steel wire is a nominal one-eighth inch fiber glass cord terminated with aluminum tubing or sleeves. The sleeves are preferably about 2 inches in length and are compressed or flattened to firmly secure the sleeves around the ends of the cord. The sleeves are then inserted through loops 24 on connector members 10 and 12 and bent into a hook shape to clinch the sleeves around loops 24, thereby securing the cord reinforcement to the connector members.

With respect to each of the flexible cordlike tension members, the particular wire and wire size, as well as the particular cord material, cord size and cord attachment means selected, should each be chosen with a view towards maintaining the flexibility of the duct, i.e., its bendability and twistability, while providing the duct with sufficient longitudinal strength to withstand at least a 50-pound axial tensile load for 24 hours. Moreover, the materials used in the tension members should each be chosen so that they are resistant to atmospheric corrosion. Also, these materials should be used only in combinations that would not cause any detrimental galvanic action which would adversely affect any part of the system formed from such materials.

The connector members 10 and 12, shown in FIGS. 1 and 2, are interlocking-type members that are provided with coupling means which permit rapid and positive interlocking of adjacent duct sections, yet means capable of being manually manipulated to permit ready uncoupling of adjacent duct sections, if desired.

More particularly, the embodiment of interlocking-type connector members shown contemplates providing the male connector member 10 with coupling means comprising a plurality of slots or apertures 28, and the female connector member 12 with coupling means comprising an equivalent number of ears or dimples 30 that are struck up from the sheet metal so that they project inwardly toward the interior of the connector member 12. In the embodiment illustrated, three generally rectangular slots 28 are provided on male connector 10. Each slot 28 is lineally spaced an equal distance from the free end of connector 10 and angularly spaced an equal distance from each other, i.e., 120° apart. Similarly, female connector 12 is provided with three essentially semihemispheroidal shaped ears 30, each of which is lineally spaced an equal distance from the free end of connector 12 and angularly spaced an equal distance from each other. As shown, slots 28 are preferably disposed closer to the free end of connector 10 than ears 30 are disposed relative to the free end of connector 12.

As will be apparent, male connector member 10 is slightly smaller in exterior circumference than the interior circumference of female connector member 12. Accordingly, when a male connector 10 on one duct section is inserted into a female connector 12 on another duct section, the free end of connector 10 cams overt over the inclined surfaces of ears 30 until the leading edges of slots 28 drop behind the vertical trailing edges of ears 30. In this position, slots 28 are disposed in circumscribing relation about ears 30 and male connector 10 is positively interlocked with female connector 12. The interaction between the leading edges of slots 28 and the vertical trailing edges of ears 30 prevents direct axial disengagement of the connector members. However, should it thereafter be desired to remove male connector 10 from female connector 12, this can be readily accomplished by simply rotating one connector member with respect to the other so that side edges of 28 cam over the inclined surfaces of ears 30 to a position where slots 28 are clear of ears 30 and the connector members can then be longitudinally disengaged.

In accordance with the present invention, connector members 10 and 12 are provided with one or more upstanding lugs 13. In the embodiment shown, connector members 10 and 12 are each provided with a pair of upstanding lugs 13, spaced 180° apart. Lugs 13 provide means for clinching the insulating blanket in place with respect to each of the connector members 10 and 12. As shown, lugs 13 are trapezoidal in shape and are struck up from the sheet metal connectors so that they are disposed generally perpendicular to the longitudinal axis of the final duct. Since the fibers forming the insulating blanket 18 tend to be oriented predominately perpendicular to the longitudinal axis of the final duct, i.e., circumferentially of the duct, lugs 13 can penetrate insulating blanket 18 with minimum resistance. In all duct sizes, trapezoidal lugs 13 are preferably about 1 inch × five-eighths inch × 1 inch high.

As the insulating blanket 18 is wrapped around the connector members 10 and 12, one or more circumferential wraps of the blanket are impaled on upstanding lugs 13. The free ends of lugs 13 are then preferably bent towards the nearest adjacent end of the duct, i.e., away from the center of the duct, until lugs 13 lie essentially parallel to the axis of the duct. Alternatively, the free ends of lugs 13 could be bent towards the center of the duct. In either case, lugs 13 penetrate and clinch the insulating blanket in place with respect to each of the connector members. Lugs 13 preferably extend completely through the thickness of insulating blanket 18, although they may only extend partially therethrough with subsequent wraps of the insulating blanket being wrapped over to the bent lugs. By reason of the foregoing structure, it will be apparent that in the final duct insulating blanket 18 becomes a significant load-bearing member to resist damage to the duct as a result of axial forces and/or torsional forces being imparted on one or both of the connector members during packaging, installation or other handling of the duct section.

In the practice of the present invention, the adhesive applied to the wire helix and sprayed on the blanket prior to fabrication to bond the helix and connector members to the insulating blanket may be any conventionally used adhesive, although a nonflammable type is preferred for safety considerations. Nonflammable adhesives are preferred also because they are frequently required by local building codes and ordinances. The adhesive used should remain flexible, even after setting, so that the duct may be flexed without permanently damaging the bond, as may occur during installation of the duct. The adhesive used should also have a composition which does not attack or corrode the material of the insulating blanket.

The preferred adhesive is a neoprene elastomer and resin adhesive. Other suitable adhesives that may be used are disclosed in the aforementioned application, Ser. No. 701,301. Also, as disclosed in said application, the same adhesive may be used on the blanket material as that applied to the wire helix. The only modification made is that the adhesive is thinned somewhat so that it may be easily sprayed on the blanket composite.

The insulating material preferably employed in the improved duct of the present invention should have a density of not less than about three-fourths of a pound per cubic foot and a tensile strength of not less than about 6 pounds per square inch in the longitudinal direction of its formation and not less than about 2 pounds per square inch in the transverse direction of its formation. One particular insulating material that fully meets the foregoing characteristics is a coherent, strand individual fiber composite insulating material in which individual glass fibers and glass fiber strands are randomly oriented and uniformly distributed throughout the other and bonded together by a thermosetting resinous binder. This insulating material and its method of manufacture are fully disclosed in the aforesaid copending application, Ser. No. 701,301, the disclosure of which is incorporated herein by reference.

The wire helix, since it is dimensionally unstable in the longitudinal direction, must be firmly bonded to the insulating blanket to maintain the spacing between convolutions. Furthermore, the bond between the wire helix and the insulating blanket must be sufficiently strong to permit flexing and unflexing of the duct without collapse or without decreasing the internal cross-sectional area of the duct, to avoid restricting fluid flow. The strand-fiber composite blanket material mentioned above develops the required strength in the duct because of its superior ability to adhere its mass to the helical wire element of the duct while at the same time maintaining a strong internal bond between the various components of the blanket material.

The flexible sleeve material employed with this invention can comprise any flexible substantially nonexpandable material such as polyvinyl chloride. The preferred sleeve material is a 3.0—3.35 mil thick extruded polyvinyl chloride tubing. Other materials, such as a polyvinylene chloride film, a laminated polyvinyl chloride film and fiber glass scrim fabric material and various neoprene impregnated glass cloths may also be used.

As will be apparent from FIG. 1, it is desirable that the finished duct section have the insulating material and flexible sleeve essentially completely covering the female connector 12 and only partly covering the male connector 10, so that when joined with other duct sections or the like, there is provided a continuous cylindrical covering of insulating material and sleeve material about the duct. Preferably, in the duct construction hereinabove described, coupling means 28 and 30 are located such that, when a connector member 10 on one duct section is interlocked with a connector member 12 on another duct section, the abutting edges of insulating material covering the respective connector members are slightly compressed to assure a continuous covering about the duct.

Additionally, the flexible sleeve material 20 may be somewhat longer than the insulating material 18, and the extra length of material (not shown) may be folded back on itself at one end of the duct section, so that by unfolding this extra length there is provided an overlap of sleeve material 20 at each joint between adjacent duct sections. This lap joint of sleeve material is preferably taped to enhance the desired fluid and vapor impermeability of flexible duct construction.

It will be apparent from the foregoing that the present invention provides an improved flexible duct construction having connector members that are provided with peripherally disposed lugs to clinch the insulating material of the duct to the connector members. Accordingly, in the final duct of this invention, the insulating material acts as a significant load-bearing member to resist damage to the duct as a result of axial forces and/or torsional forces being imparted to one or both of the connector members during normal handling and use. In accordance with the practice of this invention, any uncertainty that might otherwise have existed as to whether the connector members are securely affixed to the insulating material is completely avoided. The practice of this invention positively assures providing a strong bond between the insulating material and the connector members, and thereby greatly enhances the reliability and structural integrity of the duct section. Also, the duct of the present invention retains the desired flexibility, good air flow characteristics, competitive price and desirable acoustical characteristics of earlier flexible duct designs.

While a preferred embodiment of this invention has been illustrated and described, it will be understood that various changes and modifications may be made within the scope of the appended claims without departing from the spirit of the invention.

I claim:

1. A flexible insulated duct comprising a wire helix wrapped with a blanket of fibrous insulating material, encased in a flexible, fluid-impermeable sleeve and terminated with connector members having impaling lugs that penetrate at least one wrap of the insulating material and clinch the insulating material in place with respect to the connector members.

2. The flexible insulated duct of claim 1 wherein the impaling lugs are bent towards the ends of the duct.

3. The flexible insulated duct of claim 1 wherein the impaling lugs are bent towards the center of the duct.

4. The flexible insulated duct of claim 1 wherein at least one subsequent wrap of said insulating material is wrapped over said impaling lugs.

5. The flexible insulated duct of claim 1 wherein the insulating material is bonded together by a thermosetting resinous binder.

6. The flexible insulated duct of claim 5 wherein the insulating material has a density not less than about three-fourths of a pound per cubic foot.

7. The flexible insulated duct of claim 6 wherein the insulating material has a tensile strength of not less than about 6 pounds per square inch in the longitudinal direction of its formation.

8. The flexible insulated duct of claim 6 wherein the insulating material has a tensile strength of not less than about 2 pounds per square inch in the transverse direction of its formation.

9. The flexible insulated duct of claim 6 wherein the insulating material is a coherent, strand individual fiber composite insulating material.